Aug. 4, 1936.    F. T. DE LONG    2,049,426
BRAKE STRUCTURE
Filed March 22, 1935    2 Sheets-Sheet 1

INVENTOR
Frederic T. De Long
BY Rodney Bedell
ATTORNEY

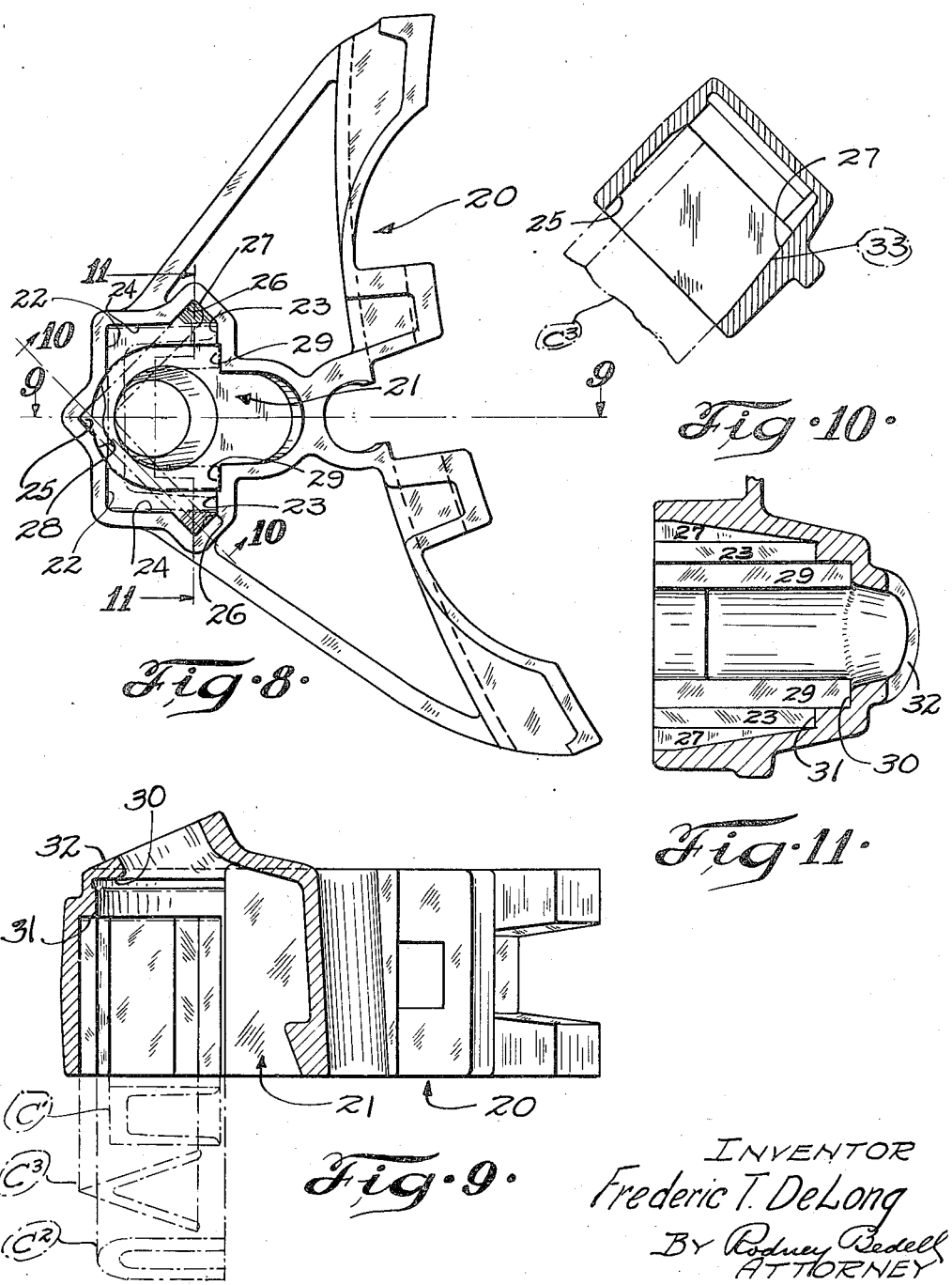

Patented Aug. 4, 1936

2,049,426

UNITED STATES PATENT OFFICE 2,049,426

BRAKE STRUCTURE

Frederic T. De Long, Chicago, Ill., assignor to Chicago Railway Equipment Company, Chicago, Ill., a corporation of Illinois Application March 22, 1935, Serial No. 12,382

9 Claims. (Cl. 188—223)

The invention relates to railway rolling stock brake beams and consists in a novel brake head structure. More particularly, the invention consists in a brake head, for truss type beams, arranged to have either one of a plurality of different shapes and lengths of compression members seated in a pocket in the head.

There are in general use large quantities of truss type brake beams in which the compression member comprises a channel iron. Other quantities of beams utilize a compression member in the form of an angle iron. Still a large number of other beams utilize a compression member of U-shaped section. Until recently each of these three types of compression members required an individual brake head for receiving the ends of the compression member and forming an anchorage for the tension member. This condition necessitated the stocking by manufacturer and railroad companies of three styles of heads in order to replace discarded heads.

In my copending applications Serial No. 580,761, filed December 14, 1931, and Serial No. 624,481, filed July 25, 1932, I have disclosed a type of head which would accommodate any one of the three compression members referred to above. But in order to properly seat the ends of the compression member, it was necessary that the lengths of the compression members should correspond.

It has not been the general practice to make the lengths of all compression members uniform, and in the three types of compression members now in general use, it is a common practice for the U-shaped compression members to be approximately 1/16 of an inch longer than the A. R. A. standard length channel section member or angle section member. Hence the brake head disclosed in the above-mentioned applications could only be applied to one of the beams having the longer compression member by cutting off the end of the latter. This is objectionable and the principal object of the present invention is to accommodate in one brake head any one of a plurality of beam compression members which differ in length as well as in cross-sectional contour.

Another object of the invention is to fit the brake head and compression member with each other more securely than is done with the constructions of said applications.

These and other detailed objects of the present invention are attained by the structure hereinafter described, reference being made to the accompanying drawings in which—

Figures 2, 4, 6:
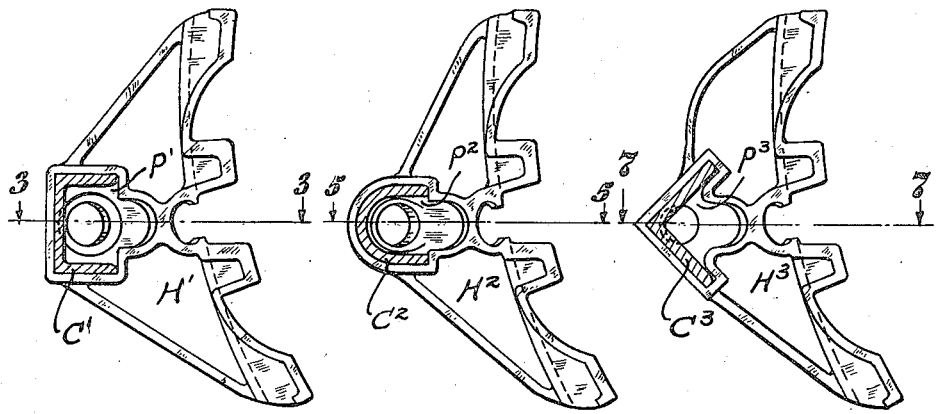
Figure 2 is a side elevation of the ordinary type of brake head arranged for a channel iron compression member, the latter being shown in section.
Figure 4 is a similar elevation of an ordinary type of brake head arranged for a U-section compression member, the latter being shown in section.
Figure 6 is a similar elevation of an ordinary type of brake head arranged for an angle iron compression member, the latter being shown in section.
Figures 3, 5, 7:
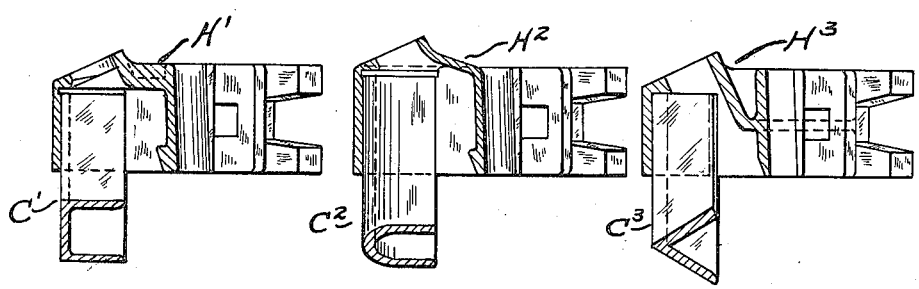

Figures 3, 5, and 7 are detail horizontal sections taken on the corresponding section lines of Figures 2, 4, and 6, respectively.

Figure 8 is a side elevation of a novel brake head forming the subject matter of the present application, the dot and dash lines on this view indicating the relative positions of the end portions of channel iron, U-section, and angle iron compression members, any one of which may be assembled with the head.

Figure 9 is a transverse horizontal section taken on the line 9—9 of Figure 8 and similarly indicating by dot and dash lines the relative positions of the different compression members when assembled with the head.

Figure 10 is a detail section taken on the line 10—10 of Figure 8.

Figure 11 is a detail section taken on the line 11—11 of Figure 8.

Figure 1:
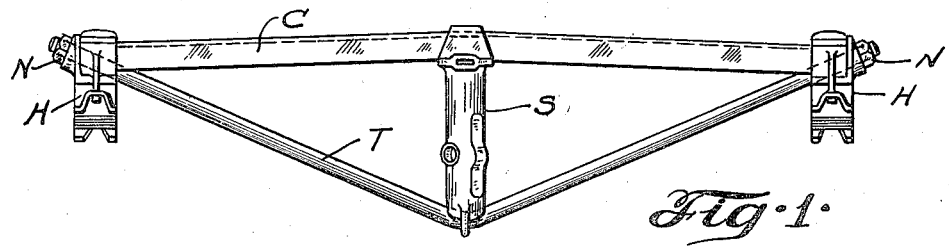
Figure 1 is a top view of a truss type brake beam of the general type referred to and showing the relation therein of the compression member, the tension member, the strut, the brake heads, and the anchoring nuts therefor.

In Figure 1, the brake heads H fit over the ends of the compression member C and the tension member T passes through the brake heads H and the assembly is drawn into rigid relation by the nuts N applied to the ends of the tension member. Strut S performs the usual function of spacing the compression member and tension member at the middle of the beam. The laterally opening pocket in the ordinary head H', Figure 2, for receiving the channel iron C' has the contour indicated at P'. The ordinary head $H^2$, Figure 4, has pocket with contour $P^2$ for receiving the U-section beam $C^2$. The ordinary head $H^3$, Figure 6, has pocket with contour $P^3$ for receiving the angle iron beam $C^3$.

In each of these three Figures, 2, 4, and 6, substantially the entire outer or convex side of the compression member C', $C^2$, or $C^3$ is engaged by a corresponding face of the head pocket. The vertical depth of member C³ is greater than that of C' and C², and the horizontal width of C² is greater than that of either of the members C' and C³, and since the shapes of the three members are so different, it is obvious that neither of the pockets P', P², or P³ would even receive one of the other compression members much less securely engage the same to prevent relative rotation of the member in the pocket.

Furthermore, it is apparent from inspection of Figures 3, 5, and 7 that the inner ends of the pockets in heads H' and H³ are arranged to seat compression members C' and C³ having the same length, whereas the pocket in head H² is arranged to seat the end of a compression member C² which is longer than the other two compression members.

The brake head 20, illustrated in Figures 8 to 11, will acommodate all three of the brake beam compression members referred to. The laterally opening pocket 21 in this head has vertical elements 22 at one side for engaging the outer wall of the channel iron compression member C' and the pocket has complementary vertical elements 23 for engaging the front edges of the channel iron compression member. The pocket has horizontal elements 24 for engaging the top and bottom faces of the channel iron. Elements 22 and 24 do not extend across the entire face of the corresponding surface of the channel iron, but such extension is unnecessary in order to securely hold the channel iron and head against relative rotation.

The head pocket has indentations 25 and 26 extending outwardly from elements 22 and 24 to accommodate the exterior of the outer ends of the angle iron compression member C³ and the forward edges of this member are engaged by the elements 27 of the pocket sides. Thus the angle iron compression member and head are held against relative rotation.

Similarly, the left hand wall of the pocket is recessed at 28 to engage the curved rear outer face of the U-shaped compression member C² and the right hand side of the pocket is recessed at 29 to engage the corresponding ends of the legs of the U-section. Accordingly, the head and U-section compression member will be held against relative movement.

The inner end of the pocket is recessed to provide an extreme bottom face 30 and a shoulder 31 between the same and the main body of the pocket. The shouldered portion 31 forms a seat for abutting the ends of the channel iron or angle iron compression members C' or C³ and the extreme bottom 30 of the pocket forms a seat for abutting the end of the longer U-section compression member C².

The exterior face 32 of the bottom of the pocket forms a seat for the nut which is screwed upon the tension member, the nut and tension member corresponding to the showing in Figure 1.

It is common practice to taper the ends of the flanges of the angle iron compression members, as indicated at 33 in Figure 10, and to more securely engage the angle iron compression members I similarly incline the corresponding elements 27 of the inner face of the pocket.

The single brake head illustrated and described is arranged to receive the end portion of any of the three types of compression members without any change or adjustment of its pocket structure, and when the tension member and holding nut are applied, the head and compression member will be held together securely without requiring any keys or other intermediate filler elements.

Hence the head described will meet all of the conditions referred to in the introductory portion of the specification.

It is practical to vary the formation of the inner ends of the pocket so that the shoulders for engaging the angle iron compression member, or the channel iron compression member, would seat either one of the latter if they were of different length, but such arrangement of the inner end of the pocket is not shown since, so far as applicant is aware, the angle iron and channel iron compression members of beams now in general use are of uniform length. However, the modification referred to and other variations referred to in the details of the construction may be made without departing from the spirit of the invention and the exclusive use of heads coming within the scope of the claims is contemplated.

I claim:

1. A railway brake head having a pocket provided with a recess at its inner end, the contour of said pocket, taken transversely of its axis, being formed to engage the sides of a brake beam compression member of one shape of cross-section, and the contour of said recess taken transversely of its axis being formed to engage the sides of a compression member of a different shape of cross-section and different overall dimensions of cross-section.

2. A railway brake head having a laterally opening pocket, the inner end of said pocket having a recess therein, there being a shoulder between the main body of the pocket and said recess, said shoulder forming a seat for engaging the end face of a beam compression member of a given length and the bottom of said recess forming a seat for engaging the end face of a longer beam compression member.

3. A railway brake head having a laterally opening pocket, there being a recess at the inner end of said pocket, the bottom of said recess forming a seat for the end face of a beam compression member of a given length and the sides of said recess being formed to engage the sides of said member, there being a shoulder between the main body of the pocket and said recess, said shoulder forming a seat for the end face of a shorter compression member having a different cross-section from said first-mentioned member and the sides of the body of said pocket being formed to engage the sides of said shorter member.

4. A railway brake head having a pocket for receiving the end portion of a brake beam compression member, the walls of said pocket having a plurality of recesses for individually engaging the side and end faces of either of a plurality of compression members of different contour of cross-sections and of different lengths.

5. A railway brake head having a pocket for receiving the end portion of a brake beam compression member, the walls of said pocket having a plurality of recesses for individually engaging the side and end faces of either of a plurality of compression members of different lengths and having cross-sectional contours of different overall dimentions.

6. In a railway brake head, a wall having an outer face for seating the holding nut for the beam tension member, and said wall having a plurality of inner faces for seating the respective ends of beam compression members of different lengths.

7. A railway brake head having an opening for the end portion of a beam compression member, one side of said pocket being shaped to engage the flat rear wall of a channel compression member and the corner of the rear wall of an angle compression member and the curved rear wall of a U-shaped compression member.

8. A railway brake head as described in claim 7 in which the opposite side of the pocket has elements for individually engaging the respective edges of the flanges of the different beam compression members.

9. A railway brake head having a pocket provided with a recess at its inner end, the contour of said pocket, taken transversely of its axis, being formed to engage the sides of a brake beam compression member of one shape of cross-section, and the contour of said recess taken transversely of its axis being formed to engage the sides of a compression member of different overall dimensions of cross-section.

FREDERIC T. De LONG.